J. O. JOHNSON.
HARROW ATTACHMENT.
APPLICATION FILED MAR. 28, 1918.
1,284,901.
Patented Nov. 12, 1918.
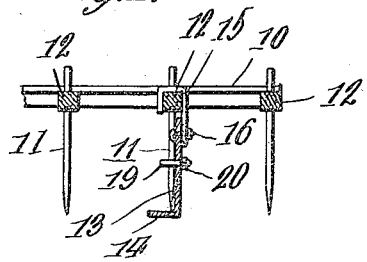
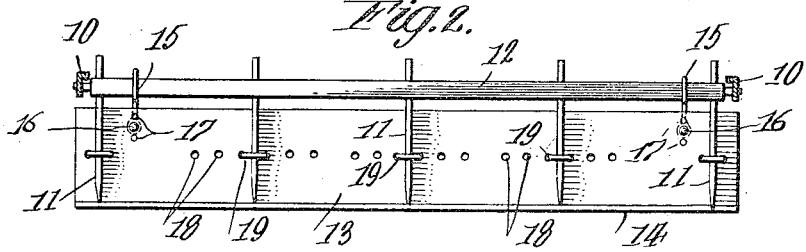
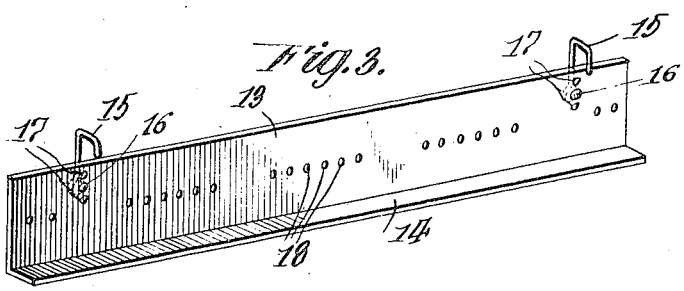
INVENTOR
John O. Johnson
WITNESSES
BY
ATTORNEY

UNITED STATES PATENT OFFICE.

JOHN O. JOHNSON, OF VIBORG, SOUTH DAKOTA.

HARROW ATTACHMENT.

1,284,901.

Specification of Letters Patent. Patented Nov. 12, 1918.

Application filed March 28, 1918. Serial No. 225,285.

*To all whom it may concern:*

Be it known that I, JOHN O. JOHNSON, a citizen of the United States, residing at Viborg, in the county of Turner and State of South Dakota, have invented certain new and useful Improvements in Harrow Attachments, of which the following is a specification.

This invention relates to an attachment for harrows and has for its object to provide a drag plate which may be removably mounted upon one of the tooth beams of a harrow and the plate secured to the teeth depending from said beam for the purpose of providing a simple and efficient means for breaking the clods of earth and smoothing the ground when the harrow is drawn thereover, said drag plate being adjustable with the harrow teeth and held in any angular position to which said teeth may be set.

With the above as the principal object in view, the invention consists in the novel construction, combination and arrangement of parts hereinafter described, pointed out in the appended claims and illustrated in the accompanying drawings, in which:

Figure 1 is a longitudinal, sectional view of a portion of the forward end of a harrow showing the drag plate in position thereon.

Fig. 2 is a vertical, cross sectional view through the harrow frame looking toward the front of the harrow, showing means for mounting the drag plate on the harrow, and, Fig. 3 is a perspective view of the drag plate.

In the drawings, 10 indicates the side bars or frame of a harrow of any well known type provided with spaced teeth 11 mounted in cross bars 12 rigidly or pivotally secured on the frame 10 to permit angular adjustment of the teeth.

The drag plate 13, preferably made of sheet steel is as long as the frame is wide and extends in a vertical direction when in place from the underside of the supporting tooth bar 12 to the lower ends or points of the teeth 11. The bottom edge of the drag plate throughout its entire length is provided with a rearwardly extending flange 14 formed by bending this edge of the plate rearwardly at a right angle to the body of the plate and by means of this flange the operative edge of the plate is greatly strengthened.

Near the top of the drag plate at each end is a supporting member 15 which in the present instance, is in the form of a hook, its lower enlarged end being fastened by a bolt 16 passing through a perforation 17 in the plate, while the upper ends of the hooks are so shaped as to fit over the tooth bar 12 of the harrow and extend downwardly sufficiently far on the side thereto to prevent disengagement of the plate while the harrow is being operated over rough ground. In the longitudinal center of the plate are formed a plurality of perforations 18 which are shown as arranged in groups to receive the ends of U-bolts 19 which pass around the teeth 11 carried by the supporting bar 12, these bolts serving to rigidly connect the drag plate to the teeth. By arranging these perforations in groups, the U-bolts are adjustable laterally of the harrow to fit them to the teeth in different harrows which are at varying distances apart. Nuts 20 are fitted on the ends of the U-bolts to tighten them around the harrow teeth.

In using this drag plate the hooks 15 are preferably hung over the tooth bar 12 next in rear of the foremost bar as shown in Fig. 1 and the U-bolts passed around the teeth 11 supported by said bar and tightened. The bottom edge of the drag plate will rest upon the ground and as the harrow is drawn thereover, will smooth the surface and break up such clods as it encounters. Any means connected to the bars 12 to change the angle of the teeth 11 will also change the angle of the drag plate so that it will at all times lie substantially parallel to the teeth.

This adjustment is of simple construction, readily attachable to the harrow and may be placed thereon and removed quickly and without trouble.

To accommodate the drag plate to harrows having teeth of various lengths, the perforations 17 for the bolts 16 are arranged in vertical series at the ends of the plate as shown, three or more of these perforations being grouped in each series.

Having described my invention, I claim:

1. An attachment for harrows comprising a plate extending crosswise of the harrow, means for sustaining the plate from the tooth bar, and means for connecting said plate to the teeth carried by said bar.

2. An attachment for harrows comprising an upstanding plate extending crosswise of the harrow from side to side and having a rearwardly turned flange on its lower edge, means for sustaining the upper edge of said plate from one of the tooth bars of the harrow, and means for fastening the plate to the teeth carried by said bar.

3. An attachment for harrows comprising an upright plate having a rearwardly extending flange on its lower edge, hooks at the upper edge of said plate adapted to engage one of the tooth bars of a harrow, and U-bolts projecting from said plate to engage the teeth carried by said bar.

4. An attachment for harrows comprising a rectangular plate having a rearwardly extending perpendicular flange on its lower edge, and a series of perforations arranged in groups longitudinally of said plate, U-bolts extending through said perforations and adapted to engage the teeth of a harrow, and hooks at the upper end of the plate to engage with and sustain the plate from the bar carrying said teeth.

In testimony whereof I affix my signature in presence of two witnesses.

JOHN O. JOHNSON.

Witnesses:
HAROLD LARSON.
JOSEPH SWENSON.

Copies of this patent may be obtained for five cents each, by addressing the "Commissioner of Patents, Washington, D. C."